(12) United States Patent
Liu

(10) Patent No.: US 9,036,184 B2
(45) Date of Patent: May 19, 2015

(54) PRINTER REGISTRATION

(75) Inventor: Eric Liu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 13/193,753

(22) Filed: Jul. 29, 2011

(65) Prior Publication Data

US 2013/0027741 A1 Jan. 31, 2013

(51) Int. Cl.
*G06F 15/00* (2006.01)
*G06F 3/12* (2006.01)
*G06K 15/00* (2006.01)

(52) U.S. Cl.
CPC ............ *G06F 3/1204* (2013.01); *G06F 3/1226* (2013.01); *G06F 3/1292* (2013.01); *G06K 15/4045* (2013.01)

(58) Field of Classification Search
CPC ..... G06F 3/1288; G06F 3/1247; G06F 3/122; G06F 3/1285; G06F 3/1292
USPC ................................ 358/1.15; 455/41.1–41.3
See application file for complete search history.

(56) References Cited

U.S. PATENT DOCUMENTS

| | | | |
|---|---|---|---|
| 7,190,471 B2 | 3/2007 | Sandfort et al. | |
| 7,194,238 B2 * | 3/2007 | Virtanen | 455/41.2 |
| 7,213,057 B2 * | 5/2007 | Trethewey | 709/218 |
| 7,676,750 B2 | 3/2010 | Lindsey, Jr. et al. | |
| 7,792,491 B2 | 9/2010 | Whitten | |
| 8,610,927 B2 * | 12/2013 | Sweet et al. | 358/1.15 |
| 2002/0181010 A1 * | 12/2002 | Pineau | 358/1.15 |
| 2002/0184318 A1 * | 12/2002 | Pineau | 709/206 |
| 2003/0002072 A1 * | 1/2003 | Berkema et al. | 358/1.15 |
| 2003/0002073 A1 * | 1/2003 | Berkema et al. | 358/1.15 |
| 2005/0099962 A1 * | 5/2005 | Matsuda | 370/254 |
| 2005/0213152 A1 * | 9/2005 | Suzuki et al. | 358/1.15 |
| 2008/0004075 A1 * | 1/2008 | Horton | 455/557 |
| 2008/0239392 A1 * | 10/2008 | Nanaumi | 358/1.15 |
| 2009/0207445 A1 * | 8/2009 | Kimura | 358/1.15 |
| 2011/0225426 A1 * | 9/2011 | Agarwal et al. | 713/175 |
| 2011/0235085 A1 * | 9/2011 | Jazayeri et al. | 358/1.14 |
| 2013/0258399 A1 * | 10/2013 | Nanaumi, Yoshihito | 358/1.15 |

OTHER PUBLICATIONS

Lop, P.; Wireless Printing From Gmail Coming Soon to Android and IOS; Jan. 27, 2011; http://www.helium.com/items/2077353-wireless-printing-from-gmail.
Printon Corporation;PrinterOn Releases Mobile Printing App for iPad, iPhone and iPod Touch; Kitchener, Ont.—Jan. 11, 2011; http://www.printeron.com/news/157-printeron-releases-mobile-printing-app-for-ipad-iphone-and-i pod-touch-. html.

* cited by examiner

*Primary Examiner* — Saeid Ebrahimi Dehkordy
(74) *Attorney, Agent, or Firm* — Norton Rose Fulbright US LLP

(57) ABSTRACT

Example embodiments disclosed herein relate to registration of a printer. It is determined that the printer is within a range of a mobile device. A short-range wireless link is established between the printer and the mobile computing device. Registration information is transmitted to a printing platform.

20 Claims, 5 Drawing Sheets

PRINTER REGISTRATION

BACKGROUND

Service providers and device manufacturers are challenged to deliver quality and value to consumers, for example by providing printing services. For example, Hewlett-Packard provides print services where a user can use a mobile device to quickly search for and print to various print locations. These print locations include print-and-copy retail stores, hotels, and airport lounges.

BRIEF DESCRIPTION OF THE DRAWINGS

The following detailed description references the drawings, wherein.

DETAILED DESCRIPTION

Figure 1:
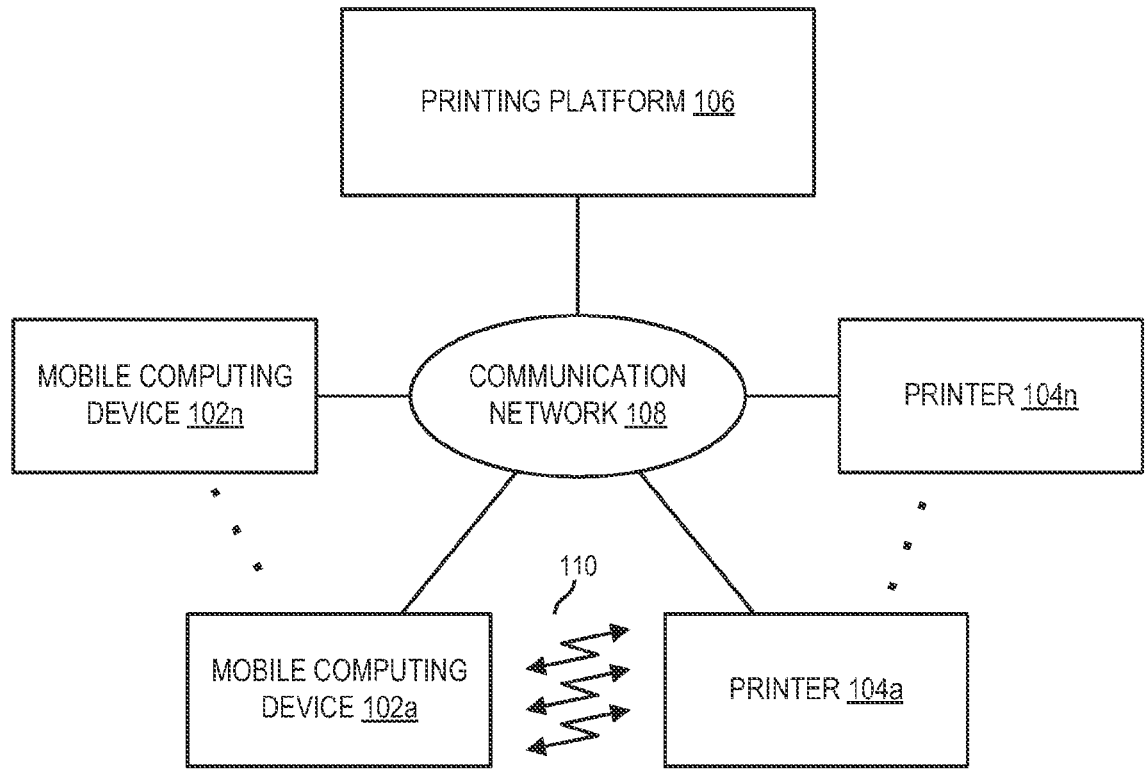
FIG. 1 is a block diagram of a system capable of registering a printer to a printing platform, according to one example.

Printers are used throughout the world as peripheral devices to produce text and/or graphics documents stored in electronic form on physical print media such as paper. Many printers are local printers that are attached by a printer cable, such as a Universal Serial Bus (USB) cable or network printers attached to a wireless and/or Ethernet based network.

Printing is often necessary when users are in a mobile environment. However, many printers are not easily portable and are thus set in locations such as a user's home, off, or special print shops. Portable printers do exist, but need to be charged and are bulky to carry around. For most consumers, it is not worth the hassle and cost to use a portable printer because the consumers need only print in a mobile environment unexpectedly and infrequently.

A printing platform, such as a server or a cloud, can be used to organize printing at various locations, such as special print shops. These print shops can be associated with locations and fee policies. However, these print shops are not located at each or even most retail stores with printing capabilities. This can be attributed, at least in part, to the overhead and difficulty of adding such printing capabilities to the printing platform.

Accordingly, various embodiments disclosed herein relate to facilitating the registration of printers by using information available at the printer and at a mobile device. Printers at various locations (e.g., retail stores, hotels, etc.) can be added to a printing system in this manner. A mobile computing device with Global Positioning System (GPS) technology and/or other location information can be used to register the printer using wireless communications. Both the mobile computing device and the printer can include short-range wireless technologies, for example, inductive technologies such as Near Field Communication (NFC), and Hewlett-Packard Touchstone. In certain embodiments, a short-range wireless link is a wireless link that can be initiated between two devices based on proximity. A level of security can be built into the communication based on the proximity. The proximity can be based on a particular technology being used, for example, within the order of 5 centimeters.

As such, when within a certain proximity of each other (e.g., within 0-4 centimeters, 0-10 centimeters, etc.) a wireless communication protocol can be used to communicate between the devices. In certain examples, the wireless communication protocol can be used to set up another type of connection (e.g., a Bluetooth® or a Wireless Local Area Network (WLAN) connection). This can occur by providing credentials between the printer and the mobile computing device and sharing communications information, for example, identifiers and/or security codes associated with connecting with the other device and/or network.

The mobile computing device can provide, via the inductive connection or another type of short-range wireless connection, the printer with information to connect to a network (e.g., a WLAN, Ethernet, etc.). In certain examples, the mobile computing device includes information about the WLAN such as security information (e.g., Wired Equivalent Privacy (WEP) key, Wi-Fi Protected Access (WPA) key, etc.), a Service Set Identifier (SSID), etc. Further, the mobile computing device may include one or more data structures including information about the owner or user of the mobile computing device and/or printer. At a business location, one or more users of the mobile computing device may have work issued mobile computing devices. As such, the information can include an account identifier associated with the user, such as a corporate identifier. Further, the information can include authentication for the associated account. Moreover, the location of the business (e.g., an address or GPS coordinates) and/or preferences for printer settings can be available at the mobile computing device. This information can be used as registration information to register the printer.

Further, information from the printer can be included in the registration information. Information from the printer can include, for example, an identifier of the printer (e.g., a Media Access Control (MAC) address, a printer name, authentication information to use the printer, etc.). Moreover, the printer information can include a printer type, ink information, features, etc.

The mobile computing device, the printer, or a combination thereof can send the registration information to a printing platform. Moreover, the registration information can be sent in pieces to register the printer with the printing platform. The printing platform can coordinate a printing service to allow use of printers by one or more users using devices. These devices may include computing devices such as mobile computing devices, laptop devices, desktop devices, servers, tablets, or the like.

Referring now to the Figures, FIG. 1 is a system diagram of printing system that can register a printer based on communication of a mobile device and the printer, according to one example. The system 100 can include one or more mobile computing devices 102a-102n that may communicate with one or more printers 104a-104n and/or a printing platform 106 via a communication network 108 and/or local wireless connections 110. In certain examples, the printing platform 106 includes computing devices, such as servers, client computers, desktop computers, mobile computers, etc. Further, in certain embodiments, a mobile computing device 102 is a cell phone, a Personal Digital Assistant (PDA), Smart phone, slate or tablet device with a touch screen interface, netbook, or other suitable device. Moreover, in certain examples, a printer 104 is a device that is capable of producing text and/or graphics documents stored in electric form on physical print media. In certain examples, printers 104 and mobile computing devices 102 can include short-range wireless communications capabilities. For example, printers 104 and mobile computing devices 102 can include inductive data exchange capabilities. Further, some printers 104 and mobile computing devices 102 can include inductive charging capabilities. Although various embodiments discussed herein may refer to inductive communications and/or links, it is contemplated that other short-range wireless capabilities may be used to implement some of the embodiments.

The printing platform 106, the mobile computing devices 102, and the printers 104 can be implemented via a processing element, memory, and/or other components. For example, a mobile computing device 102 and/or a printer 104 can include inductive coils to facilitate close proximity wireless transfer. Moreover, the printing platform 106 can be implemented as a cloud service or other network service using one or more computing devices (e.g., servers). The printing platform 106 can be used to coordinate printing at printers 104 registered to the printing platform 106.

A user of a printer 104 may wish to add the printer 104 to a network run by the printing platform 106. The user or an associated user may also have a mobile computing device 102. In one example, the user is a part of an entity or organization, such as a retail company, a service company, a charity, a political entity, or the like. The mobile computing device 102 may be issued or otherwise associated with the entity or organization. Further, the mobile computing device 102 can be registered to the user. Additionally or alternatively, the user may be an independent consumer.

To add the printer 104 to the printing platform 106, the user can bring the mobile computing device 102 within proximity of the printer 104. The proximity can be based on various technological and environmental conditions. Further, the proximity can be based on inductive coil technology built into the printer 104 and/or the mobile computing device 102. When within the proximity, an inductive link is set up between the printer 104 and the mobile computing device 102. The inductive link can be used to set up another wireless connection (e.g., WLAN, Bluetooth®, etc.) between the mobile computing device 102 and the printer 104.

The other wireless connection can be based on authentication and/or an exchange of credentials by the printer 104 and the mobile computing device 102. For example, the printer 104 and the mobile computing device 102 can share an identifier of the particular device's radio identifier to start the communications. In certain scenarios, the proximity between the two devices allows for setup of the wireless connection to be secure because the user has access to the physical devices.

The printer 104 can be in a particular state that can modify the communications via the wireless connection. For example, the printer 104 can be in an unregistered state, where the printer 104 has not been associated with a printing platform 106, an active registered state, where the printer 104 has a live connection to the printing platform 106 and is registered with the printing platform 106, and an inactive registered state, where the printer 104 is registered with the printing platform 106, but not active (e.g., because the printer 104 does not have a connection to the communication network 108). Other states or sub states are possible as well.

When the printer 104 is connected to the mobile computing device 102, the state can be checked. If the state is unregistered (e.g., in an initial setup state, a reset state, etc.), the mobile computing device 102 can be used to set authentication parameters for future use. The authentication can be based on one of various authentication techniques (e.g., a username and password to access the printer 104). Further, a registration process to register the printer 104 can be performed.

The registration process can include associating the printer 104 with the communication network 108. In one scenario, the printer 104 can already be connected to the communication network 108 (e.g., via a physical connection). In another scenario, the printer 104 can be added to a wireless access point that can connect the printer 104 to the communication network 108. The mobile computing device 102 can have an identifier of the access point as well as authentication credentials of the access point stored. The mobile computing device 102 can provide the authentication credentials and/or other information to set up the printer 104 on the communication network 108.

Further, the registration process can include formulating registration information to register the printer 104 with the printing platform 106. The registration information can include one or more identifiers of the printer 104. The identification information can be stored at the printer 104 and can include a MAC identifier, a name of the printer, other identifying information of the printer, an Internet Protocol (IP) address of the printer, or the like.

The registration information can also include information as to what account to add the printer 104 to. The account information can be initially stored on the mobile computing device 102 and transmitted to the printer 104 and included in the registration information. The account information may also include authentication information to authenticate that the printer 104 should be associated with an account of the printing platform 106. Further, the registration information can include location information of the printer 104. In certain examples, the location information includes GPS information available on the mobile computing device 102, an address stored on the mobile computing device 102, location information based on other methods (e.g., cellular identifiers, wireless access points, etc.), or combinations thereof. Other set up information can be included in the registration information. For example, one or more preferences can be added to the registration information. The preferences may include, for example, types of payment methods (e.g., credit card, cash, advertisements, receipt codes, etc.) that are included to pay for printing at the printer 104. For example, the printer 104 can be at a coffee shop. When a purchase is made, a printing code may be included in the receipt to provide for one or more free printing pages.

The registration information is sent to the printing platform 106. In certain scenarios, the information is collected at the printer and sent to the printing platform 106. In other scenarios, the registration information is collected at the mobile computing device 102 and transmitted to the printing platform 106. Further, the registration can occur in parts, where some information is transmitted by the printer 104 and some information is transmitted by the mobile computing device 102. Confirmations can be made that the printer was set up successfully. For example, a test page may be printed by the mobile computing device 102 requesting the printing platform 106 to use the printer 104.

In the active state, when the printer 104 is connected via the inductive link, multiple types of authentications can take place. One type of authentication can be a consumer authentication. This can an authentication to print at the printer 104 based on printing data (e.g., a print image, a print document, etc.), received from the mobile computing device 102 and/or printing platform 106. In certain examples, in the inactive state, a local wireless connection 110 (e.g., between a printer 104a and a mobile computing device 102a can be used to print without access to the printing platform 106. This may occur, for example, if the user is paying in cash.

Another type of authentication can be an administrator authentication, where the administrator user can change registration settings, printer settings, etc. The mobile computing device 102 can choose to perform this type of authentication based on an application stored on the mobile computing device 102. The application may include the protocols and/or authentication information required to access the printer 104. In certain scenarios, the mobile device (e.g., mobile computing device 102*n*) used for administrative authentication need not be the same mobile computing device (e.g., mobile computing device 102*a*) used for registration. The administrator authentication can be used for changing location settings of the printer 104, for example, if the printer 104 has been moved and/or changing payment types. This information can be stored locally at the printer 104 and/or at the printing platform 106.

The printing platform 106 collects information about printers 104*a*-104*n*. Further, the printing platform 106 can associate printers 104 with accounts as well as information stored with the account. For example, an entity (e.g., a retail store) with multiple locations can have account information stored at the printing platform 106. The account information can include location information (e.g., addresses) of the locations. Further, the printing platform 106 can have access to location maps and coordinates (e.g., GPS coordinates) that can allow the printing platform 106 associate coordinates and addresses. As such, if the printing platform 106 receives registration information including GPS coordinates for a printer 104 of a particular account, the GPS coordinates can be correlated with account locations to provide a location to associate the printer 104 with. A confirmation and/or a selection request can be sent to the device registering the printer 104. For example, if a mobile computing device 102 is registering the printer 104, the mobile computing device 102 may be sent options to select the location based on account information.

Consumer users of mobile computing devices 102 may desire to print while on the move. The consumer may use an application and/or a website to access the printing platform 106 to find a location of a printer nearby the user. The mobile computing device 102 can send GPS location information and/or other location information (e.g., a zip code) to the printing platform 106. The mobile computing device 102 may also send preferences on printer quality, prices, type, payment type, capabilities (e.g., color, ink, laser, glossy paper, etc.), combinations thereof, or the like.

The printing platform 106 receives the information and can determine one or more printers 104 and/or locations of printers 104 that meet the criteria. The printing platform 106 then provides the locations to the user. The user can select a location and go directly to the location. Further, in certain examples, the user can queue a print job with the printing platform 106 to be printed at a selected location and/or printer. In certain scenarios, the user's mobile computing device 102 has inductive or near field communications technology and can authenticate with a printer connected to the printing platform 106 when the user goes to the location. Additionally or alternatively, the printing platform 106 can then send the printer 104 the print job data to print. Further, the printing can occur based on a print authorization (e.g., for payment). As such, in certain examples, the user can agree to a printing rate or cost before printing.

The communication network 108 can use wired communications, wireless communications, or combinations thereof. Further, the communication network 108 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 108 can be in the form of a direct network link between devices. Various communications structures and infrastructure can be utilized to implement the communication network(s).

By way of example, the printing platform 106, printers 104, and mobile computing devices 102 communicate with each other and other components with access to the communication network 108 via a communication protocol or multiple protocols. A protocol can be a set of rules that defines how nodes of the communication network 108 interact with other nodes. Further, communications between network nodes can be implemented by exchanging discrete packets of data or sending messages. Packets can include header information associated with a protocol (e.g., information on the location of the network node(s) to contact) as well as payload information. A program or application executing on the printing platform 106, a mobile computing device 102, or a printer 104 can utilize one or more layers of communication to utilize the messages.

Figure 2:
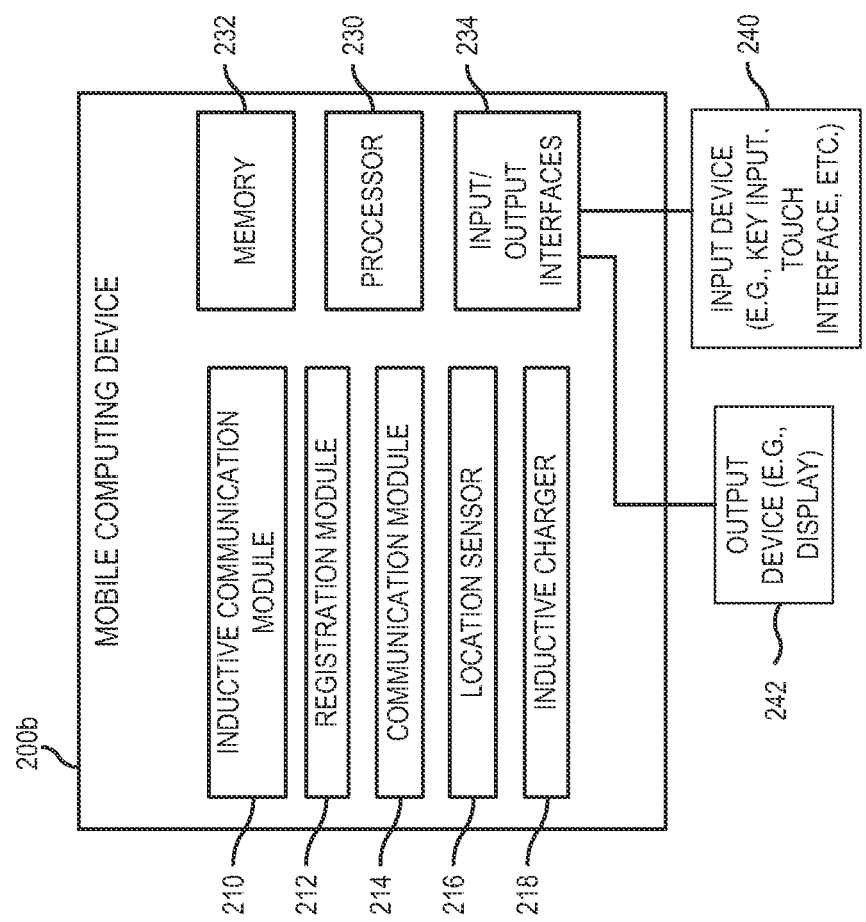
FIGS. 2A and 2B are block diagrams of mobile computing devices capable facilitating the registration of a printer to a printing platform, according to various examples.

FIGS. 2A and 2B are block diagrams of mobile computing devices capable facilitating the registration of a printer to a printing platform, according to various examples. Mobile computing devices 200*a*, 200*b* include components that can be utilized to interact with a printer to register the printer to a printing platform. The respective mobile computing devices 200*a*, 200*b* may be a cell phone, a PDA, Smart phone, slate or tablet device with a touch screen interface, netbook, or other suitable device.

The mobile computing device 200 can include an inductive communication module 210 to communicate with various components, for example, a printer, another mobile computing device, other computing devices or machines, or the like. The inductive communication module 210 can be implemented using an inductive coil and/or other hardware. Further, data exchange may also be facilitated using a NFC protocol as embodied in the International Organization for Standardization/International Electrotechnical Commission (ISO/IEC) 18092 standard/European Computer Manufacture Association (ECMA)-340 standards or the ISO/IEC 21481/ECMA-352 standards. Further, data exchange via the inductive communication module 210 may be facilitated using a proprietary protocol operating in the 3-6 MHz range.

The inductive communication module 210 can be used to interact with an inductive communication module of a printer to register the printer via a registration module 212 to a printing platform. Additionally, the inductive coil of the inductive communication module may be used to provide inductive charging to a battery (not shown) of the mobile computing device 200. As such, the inductive coil can be used to connect to a power channel that provides power to the mobile computing device 200.

When the printer and the mobile computing device 200 are physically proximate, the mobile computing device may be authenticated to the printer to establish an inductive link. In some examples, the authentication takes the form of an exchange of at least one data packet that includes a description of the protocols supported by the printer during the session, port information on which the printer may receive data from the mobile computing device, and authentication information (e.g., a hash value, a private key, a public key, a certificate, a digital signature, etc.) to authenticate the mobile computing device to the printer. In certain examples, the printer can be set up in such a manner that a default authentication process can take place initially. In other examples, the authentication process is based on one or more applications available on the mobile computing device 200. For example, a first application or process may be used to register the printer and a second application or process may be used to utilize the printer. A selection can be made based on which applications are available on the mobile computing device. Further, a mobile computing device 200 with administrator privileges can be associated with the registration process, while user privileges can be associated with other uses of the printer.

In one example, when the inductive link is established based on the proximity (e.g., touching or tapping of the mobile computing device 200 with the printer), the mobile computing device 200 communicates, via the inductive communication module 210, with the printer to share a data packet with identifying information. The inductive communication module 210 can also be used to set up an alternate, longer range communications profile (e.g., 802.11, 802.15, Bluetooth®, etc.) via a communication module 214 without user intervention. The communication module 214 can use one or more radios to communicate with the printer. In certain examples, once the connection using the communication module 214 is set up, the mobile computing device 200 can be moved away from the printer and communications can progress using the communication link associated with the communication module 214. In other examples, communication can continue using the inductive communication module 210.

When a user would like to register a printer, the user can take the mobile computing device 200 within a range of the printer. The inductive communication module 210 determines that the printer is within a range of the mobile computing device 200. The inductive communication module 210 then sets up a link between the mobile computing device 200 and an inductive communication module of the printer. As noted, in certain examples, another link can be set up between the communication module 214 of the mobile computing device 200 and the printer. Further, in certain scenarios, the mobile computing device 200 can provide the printer with network information to connect the printer to a wireless communications access point (e.g., a WLAN access point). The network information allows the printer to connect to a network capable of communicating with a printing platform. As noted above, the printing platform can be used to locate and/or print at one or more registered printers.

During the registration process, the registration module 212 generates registration information describing the printer. In certain scenarios, at least some of the registration information is developed on the mobile computing device 200. In other scenarios, at least some of the registration information is developed at the printer. In certain examples, the registration information includes printer identification information (e.g., network identifier, a MAC address, a printer name, IP address, etc.), account information (e.g., an account identifier, an account password, etc.), location information (e.g., information received from a location sensor 216, an address stored in memory 232, etc.), preferences associated with the account, combinations thereof, etc. In one example, printer identification information can be unique (e.g., a hardware identifier, a serial number, etc.) and/or may be used to communicate between the printer and the printing platform. In another example, account information can be stored on the mobile computing device 200 and may be a part of an account associated with the printing platform and the mobile computing device 200 (e.g., an account established by an entity (e.g., retail store) associated with the mobile computing device 200). Thus, multiple printers can be added to an account associated with the entity. Further, the location information can include an address of a location associated with the entity and/or coordinate information. The location sensor 216 can be implemented using GPS, cell identifiers, wireless access point network triangulation, combinations thereof, etc. As such, the registration information can include a physical location of the printer. This physical location can be stored in a memory 232 of the mobile computing device 200.

The communication module 214 can be used to transmit the registration information to the printing platform via the communication network. Additionally or alternatively, the registration information can be transmitted to the printer to transmit to the printing platform. In certain examples, the registration information is sent partly via the mobile computing device 200 and partly via the printer.

In certain scenarios, the printing platform provides access to multiple retail printing devices to computing devices. The access can include location information about the printers and/or abilities to print at the printers. Once registered, the retail printing devices include the printer. As such, a consumer user can request information about printers based on a location (e.g., based on coordinates, an address, etc.). The printing platform can return information to the user about the registered printer and/or other registered printers (e.g., based on location information received during registration). The consumer user can then send a print request, via the printing platform, to the printer. As such, a communication module at the printer receives the print request. The printer can then perform the print request.

A processor 230, such as a central processing unit (CPU) or a microprocessor suitable for retrieval and execution of instructions and/or electronic circuits can be configured to perform or facilitate the functionality of any of the modules 210-214 described herein. In certain examples, the processor 230 can include multiple processor cores and/or multiple processors. In certain scenarios, instructions and/or other information, such as location information, network information, printer information, etc., can be included in memory 232. Input/output interfaces 234 may additionally be provided by the mobile computing device 200b. For example, input devices 240, such as a keyboard, a sensor, a touch interface, a mouse, a touchpad, a microphone, etc. can be utilized to receive input from an environment surrounding the mobile computing device 200b. Further, an output device 242, such as a display, can be utilized to present information to users. Examples of output devices include speakers, display devices, amplifiers, etc. Moreover, in certain embodiments, some components can be utilized to implement functionality of other components.

Each of the modules 210-214 and other components may include, for example, hardware devices including electronic circuitry for implementing the functionality described herein. In addition or as an alternative, each module 210-214 may be implemented as a series of instructions encoded on a machine-readable storage medium of mobile computing device 200 and executable by processor 230. It should be noted that, in some embodiments, some modules are implemented as hardware devices, while other modules are implemented as executable instructions.

In certain examples, the mobile computing device 200 also includes an inductive charger 218. As such, when within a range of a printer or other device with inductive charging capabilities, a power channel can be provided by the printer or other device to provide power to the inductive charger 218. The inductive charger 218 can then charge a battery (not shown) associated with the mobile computing device 200.

Figure 3:
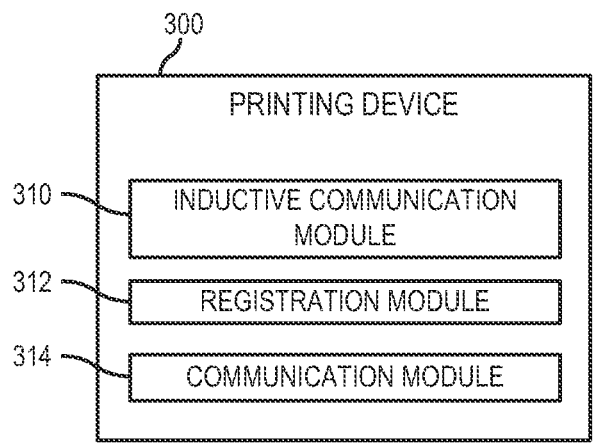
FIG. 3 is a block diagram of a printing device capable of being registered to a printing platform based on communication with a mobile computing device, according to one example.

FIG. 3 is a block diagram of a printing device capable of being registered to a printing platform based on communication with a mobile computing device, according to one example. As detailed below, printing device 300 may facilitate registration of the printing device 300 to a printing platform based on communications with a mobile device. The printing device 300 can be a printer that can produce text and/or graphics of documents stored in electronic form onto physical print media.

The printing device 300 can be implemented using a CPU, GPU, or microprocessor suitable for retrieval and execution of instructions and/or electronic circuits configured to perform the functionality of any of the modules 310-314 described herein. As detailed herein, printing device 300 may include a series of modules 310-314 facilitating the performance of methods 400 and 500. Each of the modules 310-314 may include, for example, hardware devices including electronic circuitry for implementing the functionality described below. In addition or as an alternative, each module may be implemented as a series of instructions encoded on a machine-readable storage medium. It should be noted that, in some embodiments, some modules are implemented as hardware devices, while other modules are implemented as executable instructions.

The printing device 300 can include an inductive communication module 310, a registration module 312, and a communication module 314. The printing device 300 may also include additional components, for example, a memory, a processor, a printing module, etc. A printing module can include circuitry connected to a component that can perform a physical print job, for example, a toner cartridge, an ink cartridge, etc.

The communication module 314 can include one or more technologies to enable communications between the printing device 300 and other devices and/or networks. For example, the communication module 314 can include support for one or more physical network connections (e.g., Ethernet), one or more wireless network connections (e.g., WLAN, Bluetooth®, etc.), or the like. In certain scenarios, the communication module 314 can connect to a communication network (e.g., via a network access point and/or router) that is connected to a printing platform and/or other devices. In other scenarios, the communication module 314 can communicate directly with a device (e.g., via a Bluetooth® or ad-hoc connection).

When a printing device 300 is in a default stage (e.g., a reset stage or an initial stage), a user of the printing device 300 may want to set up the printing device 300 to be associated with a printing platform. The user can also have an account associated with the printing platform. The user can bring a mobile device with information about the account, location information, and/or network connection information to the printing device 300. The user can then put the mobile device within a range of the printing device. The inductive communication module 310 determines that the printing device 300 is within a range of the mobile device. The inductive communication module 310 then set up a link between the printing device 300 and the mobile device.

The printing device 300 can perform an exchange of credentials with the mobile device to communicate with the mobile device via the communication module 314. In one example, this communication can be via a direct connection between the devices. In another example, the communication can be via a mutual network. In certain scenarios, the printing device 300 receives network information from the mobile device to connect the printing device 300 to the network. The network can be capable of facilitating communication with the printing platform. The communication module 314 can then connect to the network.

Further, the registration module 312 can communicate with the mobile device to generate registration information describing the printer. The communication module 314 and/or a communication module 314 of the mobile device can transmit the registration information to the printing platform via the network. In certain scenarios, portions of the registration information are sent via the mobile device and portions are sent via the printing device 300. In other scenarios, the printing device provides a portion of the registration information to the mobile device to send. As such, the communication module 314 can be used to transmit the registration information to the printing platform via the mobile device and network.

The registration information can include an identifier (e.g., a network identifier) of the printing device 300. Moreover, the registration information can include capabilities of the printing device 300. Further, the registration information can include a physical location of the printer. This information can be received from the mobile device (e.g., via a GPS sensor, address information stored on the mobile, etc.). Moreover, one or more preferences stored on the mobile device may be used during registration. Preferences may include payment options, availability, etc. As noted above, once registered, the printing device 300 can be used via the printing platform.

Figure 4:
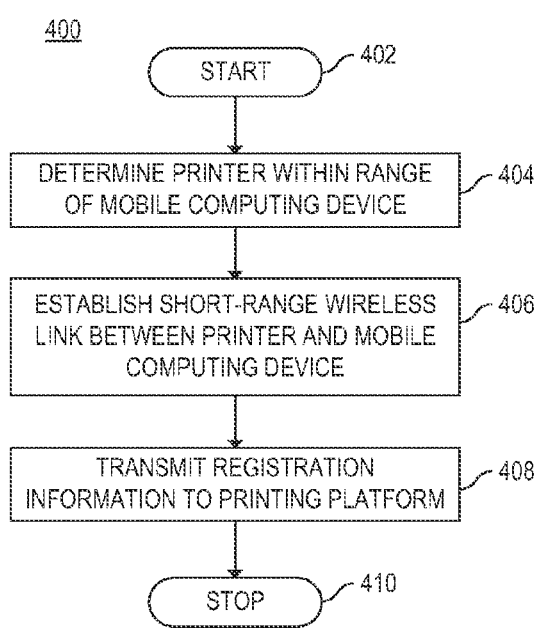
FIG. 4 is a flowchart of a method for registering a printer to a printing platform, according to one example.

FIG. 4 is a flowchart of a method for registering a printer to a printing platform, according to one example. Execution of method 400 can be implemented using a mobile computing device 200, a printing device 300, a combination thereof, and/or other suitable components. Additionally, the components for executing the method 400 may be spread among multiple devices (e.g., mobile computing device 200 and printing device 300). Method 400 may be implemented in the form of executable instructions stored on a machine-readable storage medium and/or in the form of electronic circuitry.

Method 400 may start at 402 and proceed to 404, where it is determined that a printer is within a proximate range of a mobile computing device. A short-range wireless communication module (e.g., an inductive communication module) on one or more of the devices can be used to determine whether the devices are within proximate range of each other. As such, the printer and the mobile computing device can each include short-range wireless data exchange capabilities (e.g., inductive communication).

At 406, the printer and/or the mobile computing device can establish a short-range wireless link (e.g., an inductive link) between the printer and the mobile computing device. Inductive communication modules and/or other short-range wireless communication components of the respective devices can be used to establish the link. The link can then be used for authentication and/or selection of an operation to perform. For example, the link can be used to initiate a registration of the printer and/or for printing purposes. Further, in certain scenarios, the short-range wireless link can be used to establish a mutual communication capability. This can occur by exchanging credentials, identifiers (e.g., a Bluetooth® identifier, a network identifier, a service set identifier (SSID), etc.), authentication information (e.g., security keys), etc. In certain examples, the devices can look for commonality of capabilities and then exchange credentials associated with one of the capabilities. Preferences (e.g., a switch statement) can be set for which capabilities are preferred.

In certain scenarios, the data exchange is associated with a printing mode to use the printer. This can be determined, for example, based on an application executing on the mobile computing device and/or a lack of administrator credentials on the mobile computing device. In other scenarios, the authentication yields a registration mode. This may occur if a registration application is executing on the mobile computing device and/or if the mobile computing device provides the proper credentials. In certain examples, the credentials on the printer can be changed by the mobile computing device when initially set up and/or updated via a printing platform or another communication.

The mobile computing device and/or the printer can then generate registration information to send to the printing platform. The registration information can include information that is available at the printer and information available at the mobile computing device. As noted above, the registration information may include an identifier of the printer available initially from the printer. Further, the registration information can include location information, for example, an address or coordinate location. This information can be stored at the mobile computing device and may be associated with an account, a current location of the mobile computing device (e.g., based on a GPS sensor), or a home location of the mobile computing device (e.g., a home address of an entity owner such as a retail store). Further, the registration information can include an account identifier and/or preferences associated with the account identifier. For example, an account identifier can be used to lookup an account on the printing platform associated with the entity and associate the printer with the entity. Moreover, preferences can include printing options, payment options, etc. that the user may want to associate with the printer. This information can also be stored on the mobile computing device. Some preference information can be determined at the printing platform based on the account identifier.

Then, at 408, the mobile computing device and/or printer causes transmission of the registration information to the printing platform by causing a transmitter to transmit at least part of the registration information. As noted above, the printing platform provides printing services associated with one or more printers to one or more devices. Once registered, the printers serviced by the printing platform include the printer. Then, at 410, the method 400 stops. Other processes can be executed during the method 400 as well as after the method stops. With these approaches, one or more printers can be registered to printing platforms via one or more mobile computing devices. Further, printers serviced by the printing platform can be registered using other approaches.

Figure 5:
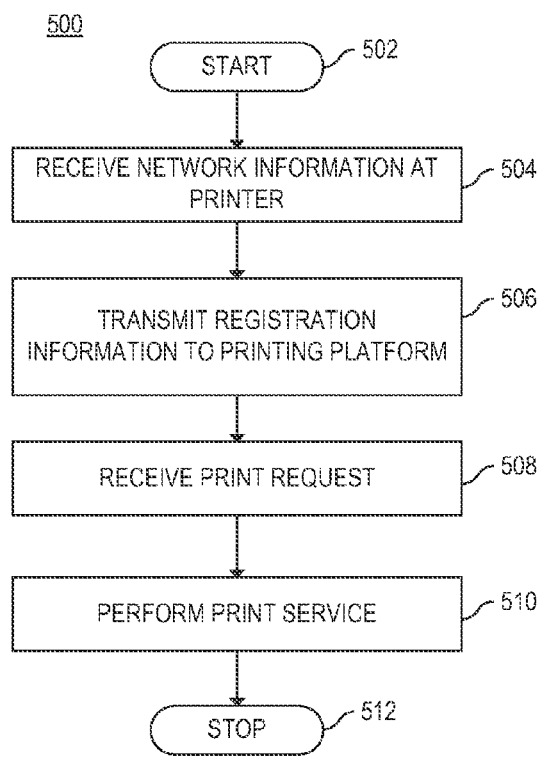
FIG. 5 is a flowchart of a method for providing a print service at a printer, according to one example.

FIG. 5 is a flowchart of a method for providing a print service at a printer, according to one example. Execution of method 500 can be implemented using a printing device 300, such as printer 104. Method 500 may be implemented in the form of executable instructions stored on a machine-readable storage medium and/or in the form of electronic circuitry.

The method 500 can start at 502 and proceed to 504, where the printer receives network information to connect the printer to a network capable of communicating with a printing platform. As noted above, this information can be received from a mobile computing device. Further, the printer can be registered. For example, at 506, the printer and/or mobile computing device can transmit registration information to the printing platform.

The printing platform can receive the registration information and add the printer to a group of printers that the printing platform services. Further, the printer can be associated with an account (e.g., an account associated with an entity such as a retail store, a hotel, etc.). The account can have preferences associated with the printer. Moreover, the registration information can add preferences for the printer. As noted above, the registration information can include location information and the printers location is known to the printing platform.

The printing platform can receive a request from a device for printing services. The printing services can be dependent upon a location. The location can be received at the printing platform and it can be determined that the printer is the correct printer to utilize. In certain examples, the printing platform receives a print request from the device. In these examples, the printing platform forwards the print request to the printer. In other examples, the printing platform provides network information about the printer to the device, which directly sends a print request. In some examples, this is done via the network. In other examples, the user of the device can come directly to the printer and provide the request.

The printer receives the request at 508. The request can be queued based on preferences. For example, the request can be put into a memory of the printer until payment arrangements are received. Examples of pay arrangements include cash, credit, payment based on advertisements, payments based on purchase of a product, etc. Then, the printer performs the print service at 510. The print service can include color printing, black and white printing, copy services, etc. At 512, the method 500 stops. Other processes can be performed during or after the method 500.

Figure 6:
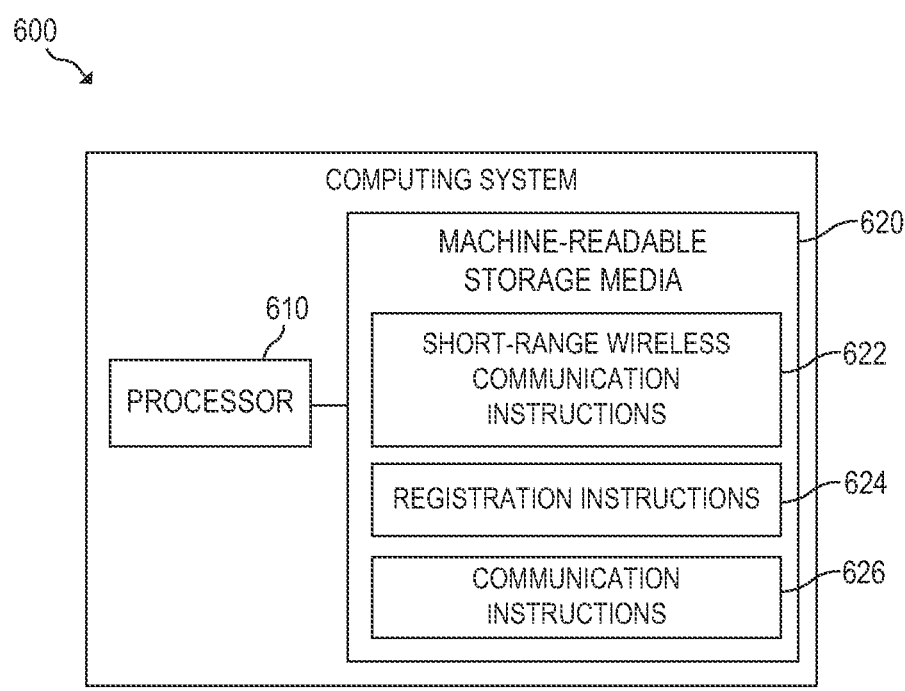
FIG. 6 is a block diagram of a computing system capable of facilitating registration of a printer, according to one example.

FIG. 6 is a block diagram of a computing system capable of facilitating registration of a printer, according to one example. The computing system 600 includes, for example, at least one processor 610, and a machine-readable storage medium 620 including instructions 622, 624, 626 for facilitating the registration of a printer. Computing system 600 may be, for example, a mobile computing device, a printer, or a combination thereof.

In certain examples, the mobile computing device and the printer can communicate by executing short-range wireless communication instructions 622 and/or communication instructions 626 via their respective processors 610. Processor 610 may be, at least one central processing unit (CPU), at least one semiconductor-based microprocessor, at least one graphics processing unit (GPU), other hardware devices suitable for retrieval and execution of instructions stored in machine-readable storage medium 620, or combinations thereof. For example, the processor 610 may include multiple cores on a chip, include multiple cores across multiple chips, multiple cores across multiple devices (e.g., if the computing system 600 includes a printer and a mobile computing device), or combinations thereof. Processor 610 may fetch, decode, and execute instructions 622, 624, 626 to implement methods 400 and 500. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Machine-readable storage medium 620 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 620 may be encoded with a series of executable instructions for facilitating the registration of the printer.

The short-range wireless communication instructions 622 can cause the processor 610 to determine that the printer is within a range of the mobile computing device. The determination can be based on inductive components that detect another inductive device when within a range. In certain examples, the processor 610 causes an inductive component to establish a short-range wireless link (e.g., an inductive link) between the printer and the mobile computing device. The link can be established by exchange of credentials. Further, another link, for example, a Bluetooth® or other wireless link can be established based on the exchange of credentials and execution of communication instructions 626. In certain scenarios, the mobile computing device can provide the printer with information (e.g., wireless security identifiers/keys) to connect the printer to a network. As such, a processor 610 of the printer can cause the printer to connect to a network. Further, the network can provide access to a printing platform. In other scenarios, the printer may already have access to the network.

The processor 610 can execute the registration instructions 624 to generate registration data including an identifier of the printer and location information stored at the mobile computing device. As such, the location information of the mobile computing device can be used to provide the location of the printer. Other information can be included in the registration data (e.g., user preferences, account information, etc.). Then, the communication instructions 626 can be used to transmit the registration data to the printing platform. The printing platform provides access information about the printer to other devices based on the registration data.

In one example, the computing system 600 is a mobile computing device that sends and receives credentials to/from the printer. Further, the mobile computing device may include logic that when executed can determine the location information based on a location sensor.

In another example, the computing system 600 is a printer. As such, the printer, once registered, can perform print services based on the printing platform. The print services can further be based on the location information sent to the printing platform during registration.

What is claimed is:

1. A method comprising:
   determining a printer is within a proximate range of a mobile computing device,
   establishing a short-range wireless link between the printer and the mobile computing device; and
   causing transmission of registration information describing the printer to a printing platform to enable the printing platform to provide access information about the printer to other devices based on the registration information,
   wherein the registration information includes information available at the printer and information available at the mobile computing device.

2. The method of claim 1, wherein the short-range wireless link is an inductive link and is used to establish another mutual communication capability.

3. The method of claim 1, wherein the registration information further includes an identifier of the printer available from the printer.

4. The method of claim 1, wherein the information from the mobile computing device includes at least one of: an address and a coordinate location.

5. The method of claim 1, wherein the mobile computing device information includes an account identifier and one or more preferences associated with the account identifier.

6. The method of claim 1, further comprising:
   receiving, at the printer, from the mobile computing device, network information to connect the printer to a network capable of communicating with the printing platform.

7. The method of claim 1, wherein the printing platform provides printing services associated with a plurality of printers to a plurality of devices and wherein the printers include the printer.

8. The method of claim 7, further comprising:
   receiving a print request associated with one of the devices,
   wherein the registration information includes location information, and
   wherein the print request is based, at least in part, on the location information.

9. A computing system comprising:
   an inductive communication module to determine that a printer is within a range of a mobile computing device,
   wherein the inductive communication module sets up a link between the printer and the mobile computing device,
   wherein the printer receives network information from the mobile computing device to connect the printer to a network capable of communicating with a printing platform;
   a registration module to generate registration information describing the printer; and
   a communication module to transmit the registration information to the printing platform via the network to enable the printing platform to provide access information about the printer to other devices based on the registration information.

10. The computing system of claim 9, wherein the registration information includes a physical location of the printer and a network identifier of the printer, and wherein the physical location is based on a memory of the mobile computing device.

11. The computing system of claim 9,
    wherein the printing platform provides access to a plurality of retail printing devices to a plurality of computing devices,
    wherein the retail printing devices include the printer,
    wherein the registration information includes location information, and
    wherein the communication module receives a print request based on the location information stored at the printing platform.

12. The computing system of claim 9,
    wherein the registration information further includes an identity of a user of the printer and preferences associated with the user, and
    wherein the identity and the preferences are based on a memory of the mobile computing device.

13. The computing system of claim 12,
    wherein the preferences include payment options to provide to the other devices.

14. A computing system comprising:
    at least one processor;
    a memory in communication with the at least one processor, the memory including logic encoded in one or more tangible media for execution and when executed operable to:
        determine that a printer is within a range of a mobile computing device;

establish a short-range wireless link between the printer and the mobile computing device;

generate registration data including an identifier of the printer and location information of the mobile computing device; and transmit the registration data to a printing platform, wherein the printing platform provides access information about the printer to other devices based on the registration data.

15. The computing system of claim 14, further comprising logic encoded in the one or more tangible media for execution and when executed operable to determine the location information based on a location sensor.

16. The computing system of claim 14, wherein the computing system is the mobile computing device.

17. The computing system of claim 14, wherein the registration data further includes an identity of an entity associated with the printer and preferences associated with the entity, and wherein the identity and the preferences are based on a memory of the mobile computing device.

18. The computing system of claim 17, wherein the preferences include payment options to provide to the other devices.

19. The computing system of claim 14, wherein the location information includes a physical location of the printer and the registration data further includes a network identifier of the printer, and wherein the physical location is based on a sensor of the mobile computing device.

20. The computing system of claim 14, wherein the transmission of the registration data causes the printer to change from an unregistered state with the printing platform to a registered state with the printing platform.

* * * * *